United States Patent
Tang et al.

(10) Patent No.: US 12,205,418 B2
(45) Date of Patent: Jan. 21, 2025

(54) VEHICLE INTELLIGENCE TOOL FOR EARLY WARNING WITH FAULT SIGNATURE

(71) Applicants: NEC Laboratories America, Inc., Princeton, NJ (US); NEC Corporation, Tokyo (JP)

(72) Inventors: Luan Tang, Pennington, NJ (US); Wei Cheng, Princeton Junction, NJ (US); Haifeng Chen, West Windsor, NJ (US); Yuji Kobayashi, Tokyo (JP); Zhengzhang Chen, Princeton Junction, NJ (US)

(73) Assignee: NEC Corporation, Tokyo (JP)

( * ) Notice: Subject to any disclaimer, the term of this patent is extended or adjusted under 35 U.S.C. 154(b) by 708 days.

(21) Appl. No.: 17/464,056

(22) Filed: Sep. 1, 2021

(65) Prior Publication Data

US 2022/0084335 A1    Mar. 17, 2022

Related U.S. Application Data

(60) Provisional application No. 63/077,324, filed on Sep. 11, 2020.

(51) Int. Cl.
*G07C 5/08*    (2006.01)
*G06N 3/04*    (2023.01)

(52) U.S. Cl.
CPC ............. *G07C 5/0808* (2013.01); *G06N 3/04* (2013.01); *G07C 5/0816* (2013.01)

(58) Field of Classification Search
CPC ...... G07C 5/0808; G07C 5/0816; G06N 3/04; G06N 3/044; G06N 3/045; G06N 3/088
See application file for complete search history.

(56) References Cited

U.S. PATENT DOCUMENTS

| | | | |
|---|---|---|---|
| 2016/0105308 A1* | 4/2016 | Dutt | G06F 9/4843 706/19 |
| 2018/0053108 A1* | 2/2018 | Olabiyi | G06N 3/044 |

(Continued)

FOREIGN PATENT DOCUMENTS

CN    107506857 A   * 12/2017   ........... G06K 9/6269

OTHER PUBLICATIONS

Cheng et al., "Meta multi-task learning for sequence modeling", Proceedings of the AAAI Conference on Artificial Intelligence. vol. 32, No. 1. Apr. 27, 2018. pp. 5070-5077.

(Continued)

*Primary Examiner* — Joseph J Dallo
(74) *Attorney, Agent, or Firm* — Joseph Kolodka

(57) ABSTRACT

A method for early warning is provided. The method clusters normal historical data of normal cars into groups based on the car subsystem to which they belong. The method extracts (i) features based on group membership and (ii) feature correlations based on correlation graphs formed from the groups. The method trains an Auto-Encoder and Auto Decoder (AE&AD) model based on the features and the feature correlations to reconstruct the normal historical data with minimum reconstruction errors. The method reconstructs, using the trained AE&AD model, historical data of specific car fault types with reconstruction errors, normalizes the reconstruction errors, and selects features of the car faults with a top k large errors as fault signatures. The method reconstructs streaming data of monitored cars using the trained AE&AD model to determine streaming reconstruction errors, comparing the streaming reconstruction errors with the fault signatures to predict and provide alerts for impending known faults.

20 Claims, 8 Drawing Sheets

(56) References Cited

U.S. PATENT DOCUMENTS

| | | | | |
|---|---|---|---|---|
| 2018/0300632 A1* | 10/2018 | Katoh | ............... | G06F 18/23 |
| 2019/0124045 A1* | 4/2019 | Zong | ............... | G06N 7/01 |
| 2019/0159735 A1* | 5/2019 | Rundo | ............... | A61B 5/725 |
| 2020/0097841 A1* | 3/2020 | Petousis | ............... | H03M 7/6023 |
| 2020/0364579 A1* | 11/2020 | Misu | ............... | G06N 3/084 |
| 2021/0094587 A1* | 4/2021 | Pilly | ............... | B60W 60/0051 |

OTHER PUBLICATIONS

Kirsch et al., "Modular networks: Learning to decompose neural computation", 32nd Conference on Neural Information Processing System. vol. 31. Dec. 3-8, 2018. pp. 2408-2418, 2018.

* cited by examiner

VEHICLE INTELLIGENCE TOOL FOR EARLY WARNING WITH FAULT SIGNATURE

RELATED APPLICATION INFORMATION

This application claims priority to U.S. Provisional Patent Application No. 63/077,324, filed on Sep. 11, 2020, incorporated herein by reference in its entirety.

BACKGROUND

Technical Field

The present invention relates to vehicles and more particularly to a vehicle intelligence tool for early warning with fault signature.

Description of the Related Art

A vehicle is a complex system with multiple components. The system faults of a vehicle can happen on different components such as the engine, battery, gears, and so forth. Such faults lead to severe economic losses and safety issues. Modern cars are installed with large number of sensors. These sensors report the corresponding state in terms of streaming data. It is thus appealing to predict and prevent the faults based on the sensor data.

SUMMARY

According to aspects of the present invention, a computer-implemented method for early warning is provided. The method includes clustering normal historical data of normal cars into a plurality of groups based on the car subsystem to which they belong. The method further includes extracting (i) features based on membership to the plurality of groups and (ii) feature correlations based on correlation graphs formed from the plurality of groups. The method also includes training, by a hardware processor, an Auto-Encoder and Auto Decoder (AE&AD) model based on the features and the feature correlations to reconstruct the normal historical data with minimum reconstruction errors. The method additionally includes reconstructing, using the trained AE&AD model, historical data of specific car fault types with reconstruction errors, normalizing the reconstruction errors, and selecting features of the car faults with a top k large errors as fault signatures. The method further includes reconstructing streaming data of monitored cars using the trained AE&AD model to determine streaming reconstruction errors, comparing the streaming reconstruction errors with the fault signatures to predict impending known faults and provide alerts for the impending known faults.

According to other aspects of the present invention, a computer program product is provided for early warning. The computer program product includes a non-transitory computer readable storage medium having program instructions embodied therewith. The program instructions are executable by a computer to cause the computer to perform a method. The method includes clustering, by a hardware processor of the computer, normal historical data of normal cars into a plurality of groups based on the car subsystem to which they belong. The method further includes extracting, by the hardware processor, (i) features based on membership to the plurality of groups and (ii) feature correlations based on correlation graphs formed from the plurality of groups. The method also includes training, by the hardware processor, an Auto-Encoder and Auto Decoder (AE&AD) model based on the features and the feature correlations to reconstruct the normal historical data with minimum reconstruction errors. The method additionally includes reconstructing, by the hardware processor using the trained AE&AD model, historical data of specific car fault types with reconstruction errors, normalizing the reconstruction errors, and selecting features of the car faults with a top k large errors as fault signatures. The method further includes reconstructing, by the hardware processor, streaming data of monitored cars using the trained AE&AD model to determine streaming reconstruction errors, comparing the streaming reconstruction errors with the fault signatures to predict impending known faults and provide alerts for the impending known faults.

According to yet other aspects of the present invention, a computer processing system is provided for early warning. The system includes a memory device for storing program code. The system further includes a processor device operatively coupled to the memory device for storing the program code to cluster normal historical data of normal cars into a plurality of groups based on the car subsystem to which they belong. The processor device further runs the program code to extract (i) features based on membership to the plurality of groups and (ii) feature correlations based on correlation graphs formed from the plurality of groups. The processor device also runs the program code to train an Auto-Encoder and Auto Decoder (AE&AD) model based on the features and the feature correlations to reconstruct the normal historical data with minimum reconstruction errors. The processor device additionally runs the program code to reconstruct, using the trained AE&AD model, historical data of specific car fault types with reconstruction errors, normalizing the reconstruction errors, and selecting features of the car faults with a top k large errors as fault signatures. The processor further runs the program code to reconstruct streaming data of monitored cars using the trained AE&AD model to determine streaming reconstruction errors, comparing the streaming reconstruction errors with the fault signatures to predict impending known faults and provide alerts for the impending known faults.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present invention are directed to a vehicle intelligence tool for early warning with fault signature.

In accordance with embodiments of the present invention, a deep neural network based, Vehicle Intelligence tool for Early Warning with Fault Signature is provided to predict the possible faults on vehicles and provide detailed information of the faults by fault signatures. The present invention trains a neural network model from big historical data, and applies the model to monitor streaming data in real time.

In accordance with one or more embodiments, the main process of the present invention can be summarized as follows:

(1) The present invention first constructs the relational graph among car sensors and partitions them into several subsystems, then retrieves the features from raw sensor signals and their correlations. In this way, the present invention retrieves the most relevant signals and filters out possible noises.

(2) The present invention uses a recurrent neural network to train a model to generate the anomaly scores, which denote how far is the incoming from normal situations. The system will also generate the fault signature, that is, the top ranked sensors that contribute to the anomaly. The fault signature can be used to classify the anomalies and also provide explanations to end users.

(3) The present invention provides different results to end users based on the anomaly score and the fault signatures: (1) If the anomaly score is low, it is the normal case, and no alert is generated; (2) If the anomaly score is higher than a threshold and shows a growing trend, it is the sign of possible failure in the near future, the present invention will then check the fault signatures: (2.1) If the fault signature is close to some existing faults, the present invention will diagnose such faults and send alerts to end users. The fault signature will also be used to provide detailed explanation of the possible failures. (2.2). If the fault signature is far from any existing faults, it means that the case is an unknown/unseen situation, it may be a new type of fault, or just some new types of normal dynamics that have not been seen in the system. The present invention will send the information back to the cloud-side for further analysis.

Figure 1:
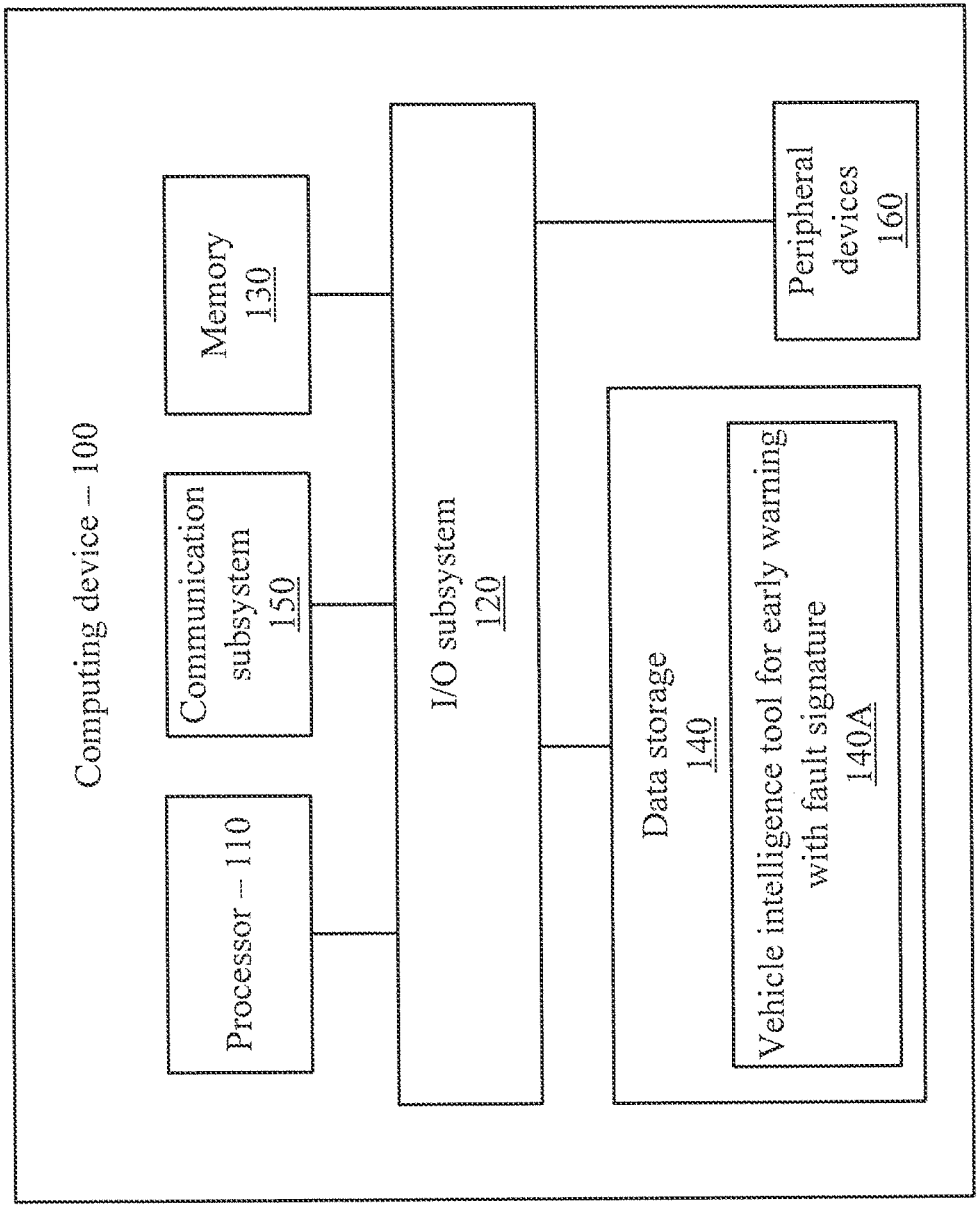
FIG. 1 is a block diagram showing an exemplary computing device, in accordance with an embodiment of the present invention.

FIG. 1 is a block diagram showing an exemplary computing device 100, in accordance with an embodiment of the present invention. The computing device 100 is configured as, or in support of, a vehicle intelligence tool for early warning with fault signature.

The computing device 100 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 100 may be embodied as a one or more compute sleds, memory sleds, or other racks, sleds, computing chassis, or other components of a physically disaggregated computing device. As shown in FIG. 1, the computing device 100 illustratively includes the processor 110, an input/output subsystem 120, a memory 130, a data storage device 140, and a communication subsystem 150, and/or other components and devices commonly found in a server or similar computing device. Of course, the computing device 100 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 130, or portions thereof, may be incorporated in the processor 110 in some embodiments.

The processor 110 may be embodied as any type of processor capable of performing the functions described herein. The processor 110 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 130 may be embodied as any type of volatile or non-volatile memory or data storage capable of performing the functions described herein. In operation, the memory 130 may store various data and software used during operation of the computing device 100, such as operating systems, applications, programs, libraries, and drivers. The memory 130 is communicatively coupled to the processor 110 via the I/O subsystem 120, which may be embodied as circuitry and/or components to facilitate input/output operations with the processor 110 the memory 130, and other components of the computing device 100. For example, the I/O subsystem 120 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.) and/or other components and subsystems to facilitate the input/output operations. In some embodiments, the I/O subsystem 120 may form a portion of a system-on-a-chip (SOC) and be incorporated, along with the processor 110, the memory 130, and other components of the computing device 100, on a single integrated circuit chip.

The data storage device 140 may be embodied as any type of device or devices configured for short-term or long-term storage of data such as, for example, memory devices and circuits, memory cards, hard disk drives, solid state drives, or other data storage devices. The data storage device 140 can store program code for a vehicle intelligence tool for early warning with fault signature. The communication subsystem 150 of the computing device 100 may be embodied as any network interface controller or other communication circuit, device, or collection thereof, capable of enabling communications between the computing device 100 and other remote devices over a network. The communication subsystem 150 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 100 may also include one or more peripheral devices 160. The peripheral devices 160 may include any number of additional input/output devices, interface devices, and/or other peripheral devices. For example, in some embodiments, the peripheral devices 160 may include a display, touch screen, graphics circuitry, keyboard, mouse, speaker system, microphone, network interface, and/or other input/output devices, interface devices, and/or peripheral devices.

Of course, the computing device 100 may also include other elements (not shown), as readily contemplated by one of skill in the art, as well as omit certain elements. For example, various other input devices and/or output devices can be included in computing device 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 100 are readily contemplated by one of ordinary skill in the art given the teachings of the present invention provided herein.

As employed herein, the term "hardware processor subsystem" or "hardware processor" can refer to a processor, memory (including RAM, cache(s), and so forth), software (including memory management software) or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

Figure 2:
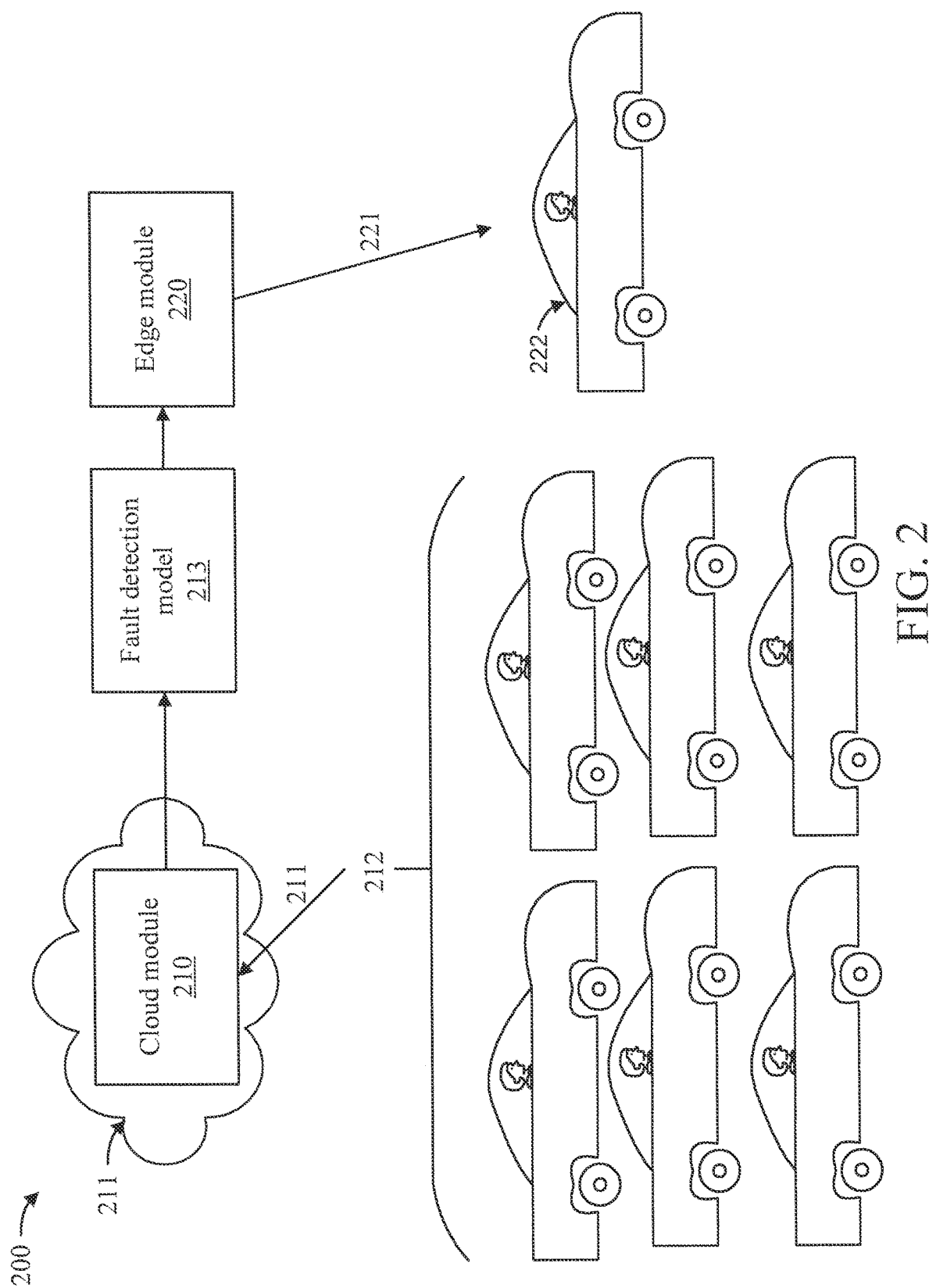
FIG. 2 is a block diagram showing an exemplary overall framework, in accordance with an embodiment of the present invention.

FIG. 2 is a block diagram showing an exemplary overall framework 200, in accordance with an embodiment of the present invention. There are two major modules in the system, namely a cloud module 210 and an edge module 220. The cloud module 210 is designed for training 211 fault sign models from historical data. The edge module 220 is proposed for online monitoring 221 and reporting warnings in real time. The cloud module 210 is installed on a cloud server 217. The cloud module 210 takes the big data collected from multiple cars 212 as input and outputs the learned model 213 of fault sign detection. The cloud module 210 relies on GPU for computation of deep neural networks and computation load is heavy. In contrast, the edge module 220 takes the learned fault sign model 213 as input, it is implemented in ECU on the cars 222 and monitors the streaming sensor data. It is a lightweight module and can generate the warnings of possible faults by only one scan of the data.

The cloud module 210 is the main component of model building. It takes the automobile data for input and outputs the fault sign models 213.

Figure 3:
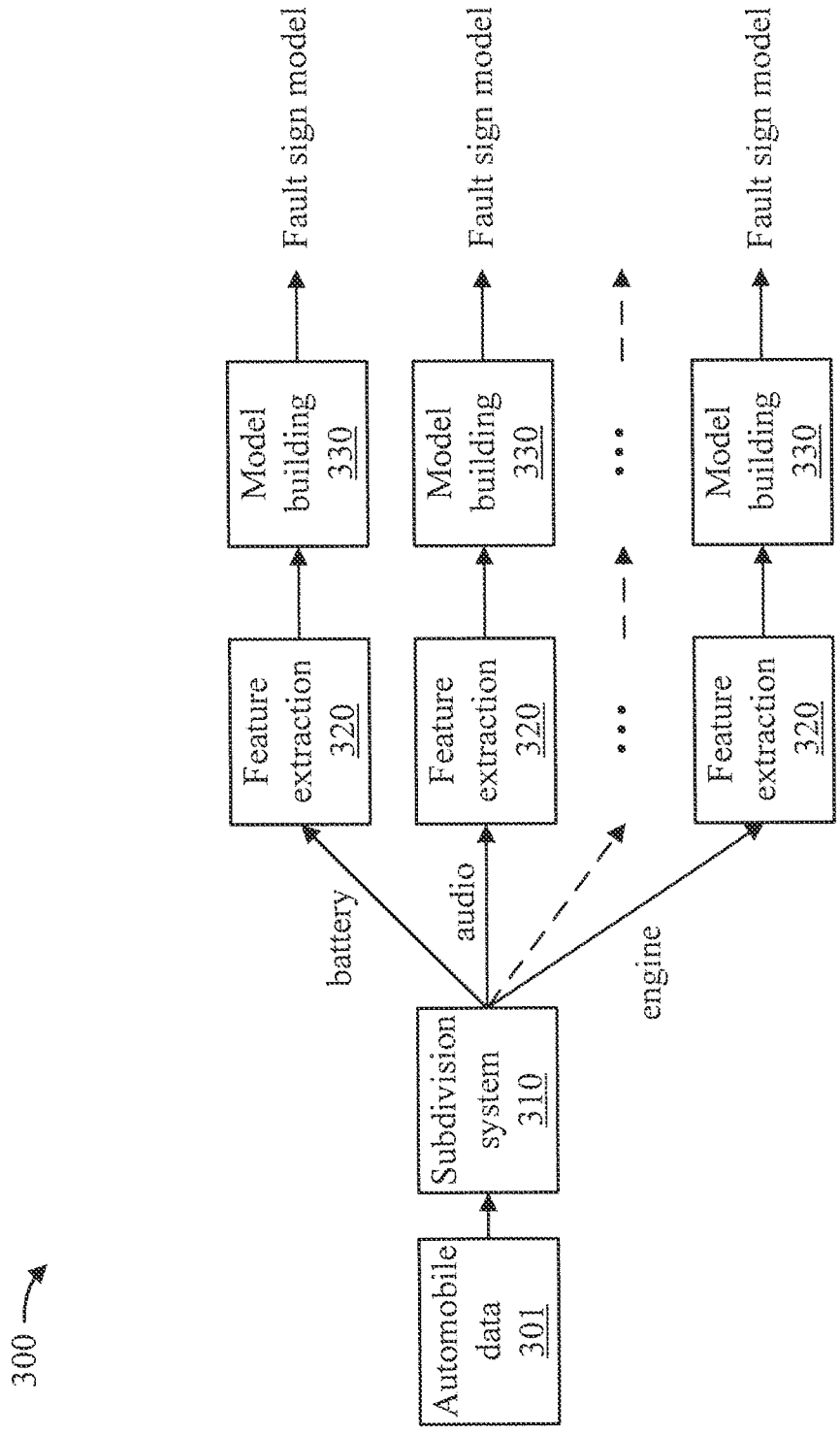
FIG. 3 is a block diagram showing components of the cloud module of FIG. 2, in accordance with an embodiment of the present invention.

FIG. 3 is a block diagram showing components of the cloud module 210 of FIG. 2, in accordance with an embodiment of the present invention.

There are three major components of the cloud module, as shown in FIG. 3 and described as follows.

Subsystem Division 310: this component clusters the sensor data 301 from cars into several groups based on their relationship.

Feature Extraction 320: this component retrieves the main features from both raw time series and correlation graphs from data.

Model Building 330: this component computes the models 331 for an anomaly score and fault signature to detect possible faults.

A further description will now be given regarding the sub-system division component A modern car nowadays usually includes dozens sensors to monitor various sub-systems. They may generate 100 or more different sensor signals from those sub-systems, including engine control, battery and recharging, audio, mirror adjustment, etc. Unfortunately, the information of sensors and sub-systems are not available in the data, so the system has to learn such information as the first step.

The signals within the same sub-system usually have strong correlations to each other, while the signals from different subsystems have low correlations. Hence, the system can make sub-system division 310 by performing the correlation analysis on the historical sensor data. It can also generate a correlation graph to represent the correlations among different sensors.

Based on the graph, the system can further conduct clustering and the clustered sensors are chosen as the representations of different subsystems. Note that the present invention adopts soft clustering to identify subsystems, i.e., the connecting nodes between two clusters belong to both sub-systems. Since some sensors are indeed important for different sub-systems, e.g., the engine.

As an example, Revolutions Per Minute (RPM) is a key signal for the engine sub-system, but it is also important for the gear sub-system.

Example 1: There are about 50 sensors, each is represented as a node. If two sensor signals have high correlations, an edge is constructed to link the two nodes.

The 50 sensors can be divided into about six sub-systems, including the engine, door control, audio, battery, mirror, airbag, etc.

A further description will now be given regarding feature extraction, in accordance with an embodiment of the present invention.

In the feature extraction step, two categories of features are included by the present invention as follows: (1) The values of the sensor signals, such as engine RPM, temperature, battery voltage, are important and indicative of car's operating condition; (2) The correlations among different sensors.

Figure 4:
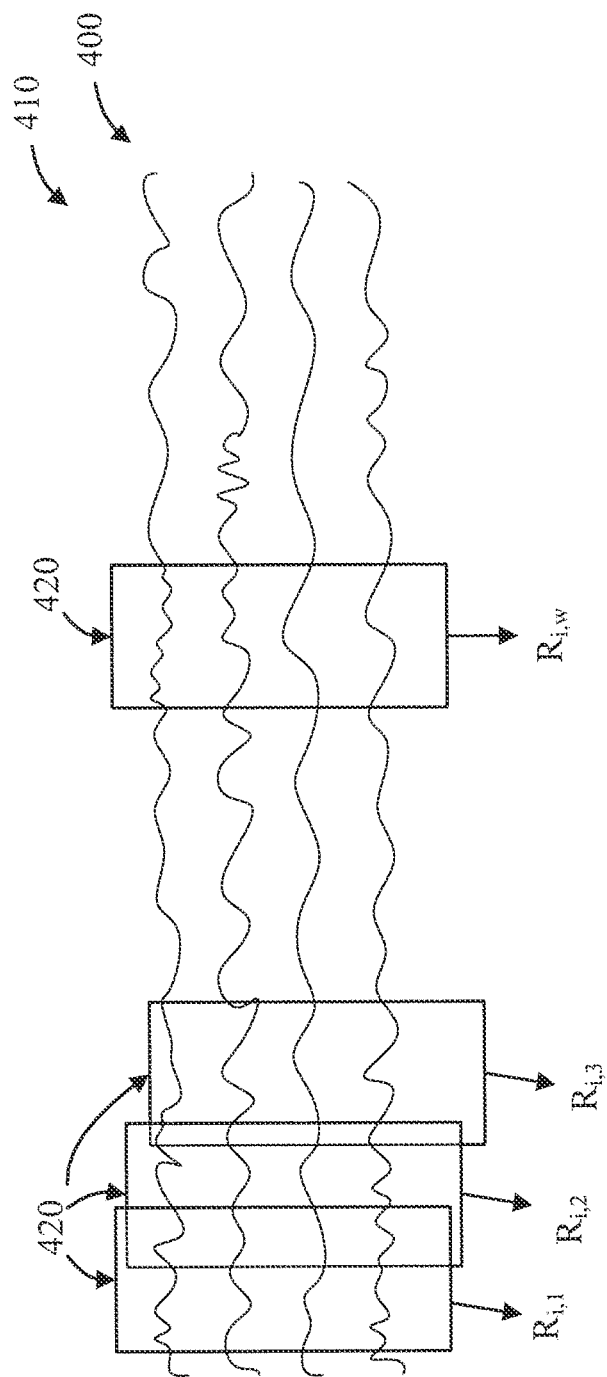
FIG. 4 is a diagram showing exemplary features of sensor signals, in accordance with an embodiment of the present invention.

Example 2. FIG. 4 is a diagram showing exemplary features 400 of sensor signals 410, in accordance with an embodiment of the present invention. The present invention uses sliding windows 420 to divide the sensor data into many windows.

The values of the sensor signals 410 may have pretty large dynamics during normal operation. In many times, their signal trends are not reliable. However, the correlations among different signals are much more stable over time. In addition, the correlations are more trustworthy. A large change of signal correlation usually denotes some abnormal events on the car components.

Figure 5:
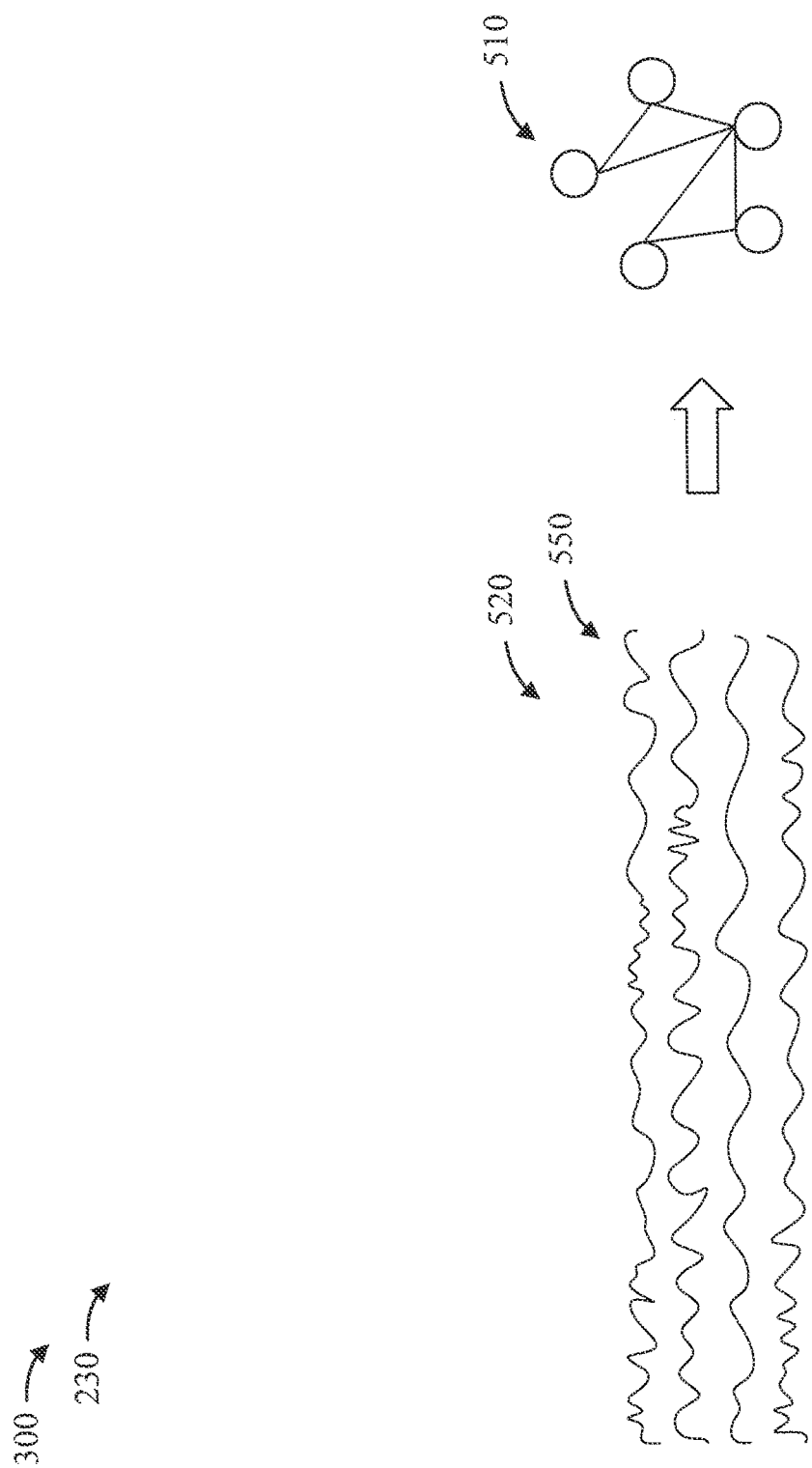
FIG. 5 is a block diagram showing an exemplary retrieval of a correlation graph 510 from Controller Area Network (CAN) bus signals, in accordance with an embodiment of the present invention.

Example 3. FIG. 5 is a block diagram showing an exemplary retrieval 500 of a correlation graph 510 from Controller Area Network (CAN) bus signals 520, in accordance with an embodiment of the present invention. As shown in FIG. 5, a correlation graph 510 is computed for a time window as another part of extracted features 550 in the CAN bus signals 520.

A further description will now be given regarding model training, in accordance with an embodiment of the present invention.

To build the prediction model, a recurrent neural network architecture is chosen due to its advantage on temporal sequences.

Figure 6:
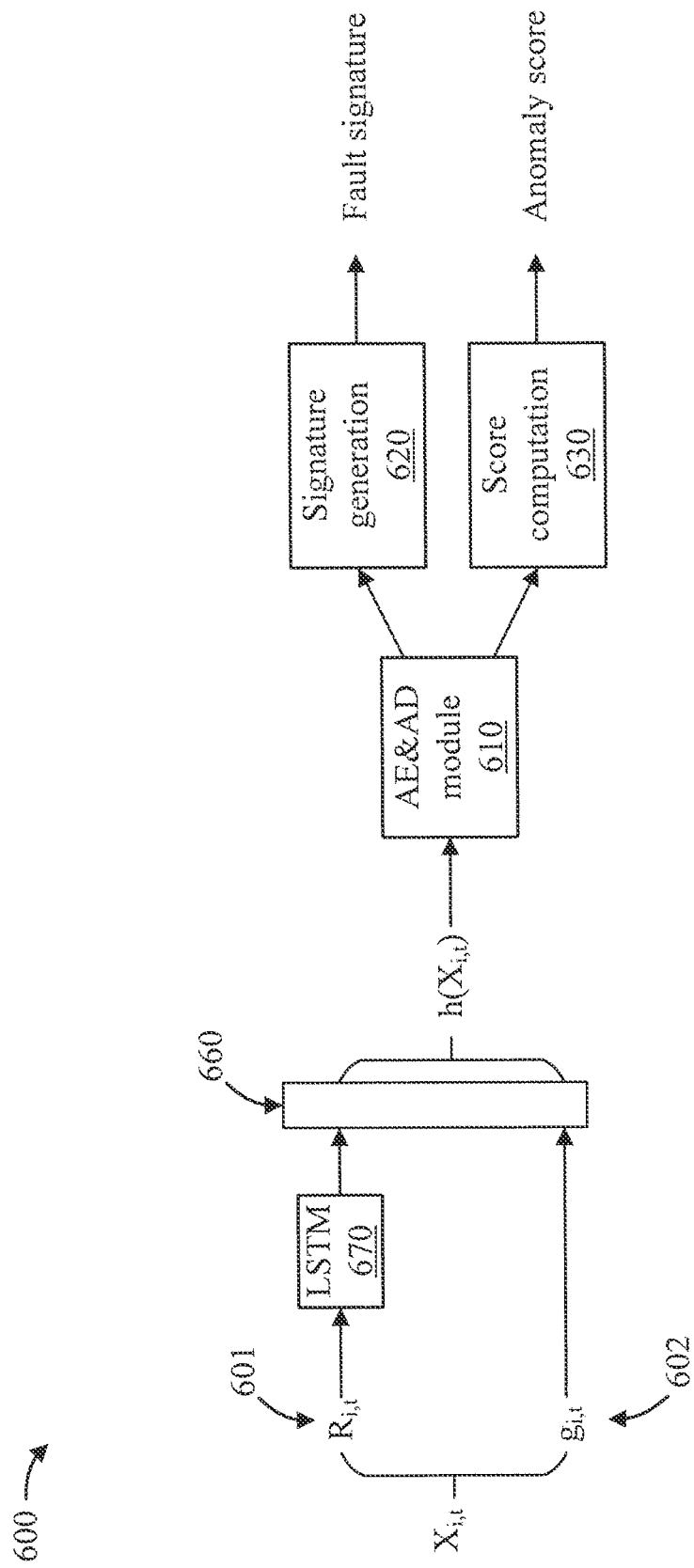
FIG. 6 is a block diagram showing an exemplary model, in accordance with an embodiment of the present invention.

FIG. 6 is a block diagram showing an exemplary model 600, in accordance with an embodiment of the present invention. As shown in FIG. 6, the input data includes both raw sensor signals 601 and a corresponding correlation graph 602. First, a LSTM architecture 670 is applied on the sensor signals 601 and its output is directly concatenated 660 with the correlation graph 602 as our feature embedding h(X_i,t).

Based on the feature embedding, the present invention uses an AE&AD (Auto-Encoder & Auto-Decoder) module 610 to reconstruct the features. The reconstruction errors of the features are used to generate the fault signatures by a signature generation module 620 and compute anomaly scores by the score computation module 630.

A further description will now be given regarding the AE&AD module 610, in accordance with an embodiment of the present invention.

Figure 7:
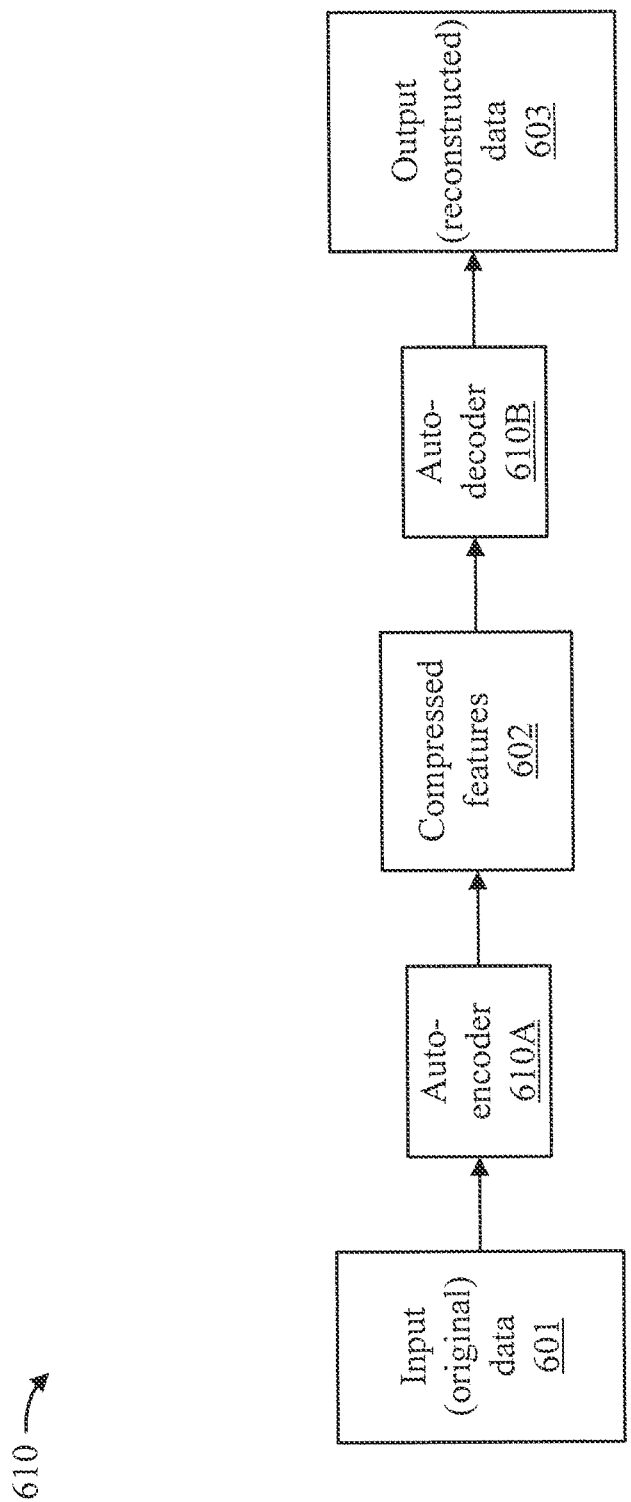
FIG. 7 is a block diagram further showing the AE&AD module of FIG. 6, in accordance with an embodiment of the present invention.

FIG. 7 is a block diagram further showing the AE&AD module 610 of FIG. 6, in accordance with an embodiment of the present invention.

The auto-encoder (AE) portion 610A of the AE&AD module 610 is a neural network that casts the input data into a space with reduced dimension. The auto-decoder (AD) portion 610B of the AE&AD module 610 is a neural network which is symmetric to the auto-encoder. The AD portion 610B casts the input data into a space with increased dimension. The AE portion 610A is used to compress the data 601 and the AD portion 610B is used to reconstruct the data 603 from the compressed data (features) 602.

Example 4. Suppose there are 70 sensors and 30 correlations in the data. The total dimension of the input data is 100. The AE portion 610A can cast the data into a space with fewer dimensions (e.g., 25 dimensions). The AD portion 610B can reconstruct the data of 100 dimensions from the compressed data.

A further description will now be given regarding the signature generation module 520 of FIG. 5, in accordance with an embodiment of the present invention.

After reconstruction of the data, the present invention compares the original data with the reconstruction data, with the differences called "reconstruction errors". For each feature (raw sensors and correlations), there is an individual reconstruction error value. The present invention normalizes such values and selects the features with top k large error (k is pre-defined by user) as the fault signature.

A further description will now be given regarding the score computation module 530 of FIG. 5, in accordance with an embodiment of the present invention.

After reconstruction the data, the present invention integrates the reconstruction errors as the anomaly scores. The integration can be a weighted sum, with the weight for each feature being pre-defined by the user.

In the model training stage, the present invention will train the AE&AD's network parameters to minimize the reconstruction error on normal samples. In the testing stage, the reconstruction error is computed for each incoming sample, and the anomaly score is calculated based on the reconstruction error. If the anomaly score suddenly (within a threshold time amount) increases, some types of anomaly may happen.

A description will now be given regarding online monitoring, in accordance with an embodiment of the present invention.

The edge module 220 receives the trained model from the cloud module 210, applies the trained model on streaming sensor data and generates two scores for each time window. Based on the changes of the two scores, the edge module 220 makes different outputs. The detailed strategies are as follows:

If both anomaly scores are low, then the vehicle system works well and it is in normal condition, no warning needs to be generated;

If the anomaly score is higher than a threshold and continues increasing, and the fault signature matches or is similar to the fault signature of existing faults, then it is a known fault, and the present invention will generate alerts to the end user;

If the anomaly score is higher than a threshold and continues increasing, and the fault signature does not match to any existing fault signatures, then it is an unknown fault. In such case, the present invention will not generate early warnings to the driver, but will send the information back to cloud module 210 to ask domain experts for further judgement.

Figure 8:
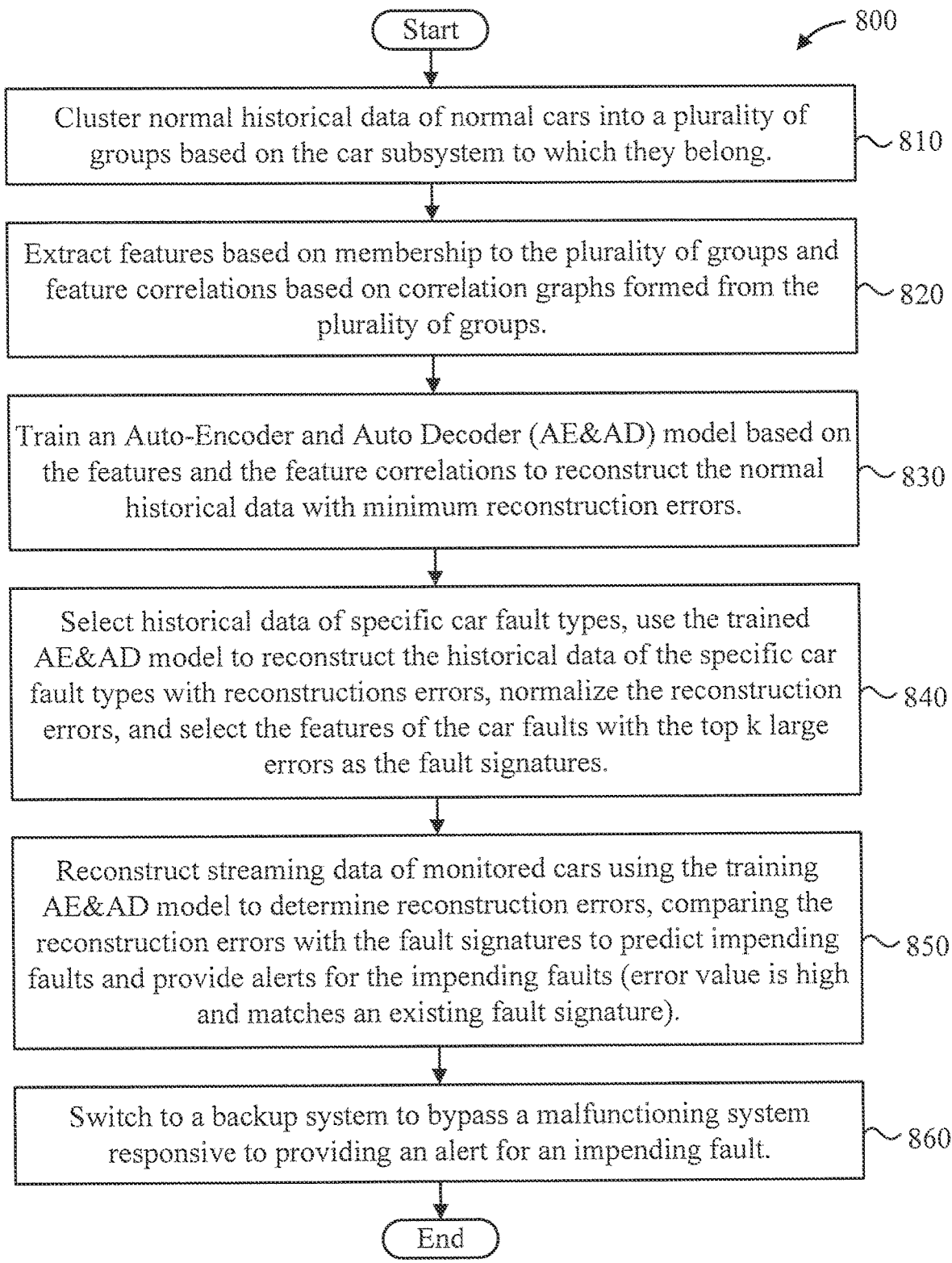
FIG. 8 is a flowchart for an exemplary method for vehicle intelligence tool-based early warning with fault signature, in accordance with an embodiment of the present invention.

FIG. 8 is a flowchart for an exemplary method 800 for vehicle intelligence tool-based early warning with fault signature, in accordance with an embodiment of the present invention.

The method 800 can be considered to include three main stages: model training; signature generation; and online testing. Blocks 810-830 pertain to model training. Block 840 pertains to signature generation. Blocks 850 and 860 pertains to online testing.

At block 810, cluster normal historical data of normal cars into a plurality of groups based on the car subsystem to which they belong.

At block 820, extract features based on membership to the plurality of groups and feature correlations based on correlation graphs formed from the plurality of groups.

At block 830, train an Auto-Encoder and Auto Decoder (AE&AD) model based on the features and the feature correlations to reconstruct the normal historical data with minimum reconstruction errors.

At block 840, select historical data of specific car fault types, use the trained AE&AD model to reconstruct the historical data of the specific car fault types with reconstructions errors, normalize the reconstruction errors, and select the features of the car faults with the top k large errors (k is pre-defined by user) as the fault signatures.

At block 850, reconstruct streaming data of monitored cars using the training AE&AD model to determine reconstruction errors, comparing the reconstruction errors with the fault signatures to predict impending faults and provide alerts for the impending faults (error value is high and matches an existing fault signature).

At block 860, switch to a backup system to bypass a malfunctioning system responsive to providing an alert for an impending fault.

Some of the many attendant features/advantages of the present invention include, but are not limited to:

(1) Analysis on car sensor data and predict the possible future failure in online time;

(2) The present invention only requires a limited set of training data, especially the size of fault training data could be quite small.

(3) The present invention has different reporting strategies based on the anomaly scores and fault signatures. The present invention can deal with multiple fault types with a low false alert rate.

(4) The framework of the present invention has two parts, the cloud-side builds the model and the edge-side applies the model. Such framework is specifically designed for a car, and makes the present invention flexible with different car models.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for early warning, comprising:
    clustering normal historical data of normal cars into a plurality of groups based on a car subsystem to which they belong;
    extracting (i) features based on membership to the plurality of groups and (ii) feature correlations based on correlation graphs formed from the plurality of groups to retrieve relevant signals and filter signal noise;
    training, by a hardware processor, an Auto-Encoder and Auto Decoder (AE&AD) model based on the features and the feature correlations to reconstruct the normal historical data by minimizing reconstruction errors;
    reconstructing, using the trained AE&AD model, historical data of specific car fault types with reconstruction errors, normalizing the reconstruction errors, and selecting features of the car faults with a top k large errors as fault signatures; and
    reconstructing streaming data of monitored cars using the trained AE&AD model, installed in an edge module of the monitored car that is connected to an online car monitoring system, to determine streaming reconstruction errors, comparing the streaming reconstruction errors with the fault signatures to predict impending known faults and provide alerts for the impending known faults.

2. The computer-implemented method of claim 1, further comprising switching to a backup system to bypass a malfunctioning system responsive to providing an alert for an impending fault.

3. The computer-implemented method of claim 1, wherein the AE&AD model is trained using a recurrent neural network.

4. The computer-implemented method of claim 1, wherein an auto-encoder portion of the AE&AD comprises a neural network for casting the features and the feature correlations into a space with reduced dimension to obtain compressed features, and wherein an auto-decoder portion of the AE&AD comprises a neural network that casts the compressed features into a space with increased dimension.

5. The computer-implemented method of claim 4, wherein the neural network comprised in the auto-encoder portion of the AE&AD is symmetric with the neural network comprised in the auto-decoder portion of the AE&AD.

6. The computer-implemented method of claim 1, wherein the AE&AD model comprises a Long Short-Term Memory (LSTM) for receiving the normal historical data, wherein an output of the LSTM is concatenated with a feature correlation graph as an input to an auto-encoder comprised in the AE&AD model.

7. The computer-implemented method of claim 1, further comprising computing anomaly scores from the reconstruction errors.

8. The computer-implemented method of claim 7, wherein the reconstruction errors are integrated by weighted sum into the anomaly scores.

9. The computer-implemented method of claim 7, wherein the reconstruction errors that are normalized comprise a first reconstruction error for a given feature and a second reconstruction error for a feature correlations between the given feature and another feature.

10. A computer program product for early warning, the computer program product comprising a non-transitory computer readable storage medium having program instructions embodied therewith, the program instructions executable by a computer to cause the computer to perform a method comprising:

clustering, by a hardware processor of the computer, normal historical data of normal cars into a plurality of groups based on a car subsystem to which they belong;

extracting, by the hardware processor, (i) features based on membership to the plurality of groups and (ii) feature correlations based on correlation graphs formed from the plurality of groups;

training, by the hardware processor, an Auto-Encoder and Auto Decoder (AE&AD) model based on the features and the feature correlations to reconstruct the normal historical data by minimizing reconstruction errors;

reconstructing, by the hardware processor using the trained AE&AD model, historical data of specific car fault types with reconstruction errors, normalizing the reconstruction errors, and selecting features of the car faults with a top k large errors as fault signatures; and reconstructing, by the hardware processor, streaming data of monitored cars using the trained AE&AD model, installed in an edge module of the monitored car that is connected to an online car monitoring system, to determine streaming reconstruction errors, comparing the streaming reconstruction errors with the fault signatures to predict impending known faults and provide alerts for the impending known faults.

11. The computer program product of claim 10, further comprising switching to a backup system to bypass a malfunctioning system responsive to providing an alert for an impending fault.

12. The computer program product of claim 10, wherein the AE&AD model is trained using a recurrent neural network.

13. The computer program product of claim 10, wherein an auto-encoder portion of the AE&AD comprises a neural network for casting the features and the feature correlations into a space with reduced dimension to obtain compressed features, and wherein an auto-decoder portion of the AE&AD comprises a neural network that casts the compressed features into a space with increased dimension.

14. The computer program product of claim 13, wherein the neural network comprised in the auto-encoder portion of the AE&AD is symmetric with the neural network comprised in the auto-decoder portion of the AE&AD.

15. The computer program product of claim 10, wherein the AE&AD model comprises a Long Short-Term Memory (LSTM) for receiving the normal historical data, wherein an output of the LSTM is concatenated with a feature correlation graph as an input to an auto-encoder comprised in the AE&AD model.

16. The computer program product of claim 10, further comprising computing anomaly scores from the reconstruction errors.

17. The computer program product of claim 16, wherein the reconstruction errors are integrated by weighted sum into the anomaly scores.

18. The computer program product of claim 16, wherein the reconstruction errors that are normalized comprise a first reconstruction error for a given feature and a second reconstruction error for a feature correlations between the given feature and another feature.

19. A computer processing system for early warning, comprising:

a memory device for storing program code; and a processor device operatively coupled to the memory device for storing the program code to cluster normal historical data of normal cars into a plurality of groups based on a car subsystem to which they belong;

extract (i) features based on membership to the plurality of groups and (ii) feature correlations based on correlation graphs formed from the plurality of groups to retrieve relevant signals and filter signal noise;

train an Auto-Encoder and Auto Decoder (AE&AD) model based on the features and the feature correlations to reconstruct the normal historical data by minimizing reconstruction errors;

reconstruct, using the trained AE&AD model, historical data of specific car fault types with reconstruction errors, normalizing the reconstruction errors, and selecting features of the car faults with a top k large errors as fault signatures; and reconstruct streaming data of monitored cars using the trained AE&AD model, installed in an edge module of the monitored car that is connected to an online car monitoring system, to determine streaming reconstruction errors, comparing the streaming reconstruction errors with the fault signatures to predict impending known faults and provide alerts for the impending known faults.

20. The computer processing system of claim 19, wherein the processor device further runs the program code to switch to a backup system to bypass a malfunctioning system responsive to providing an alert for an impending fault.

* * * * *